UNITED STATES PATENT OFFICE.

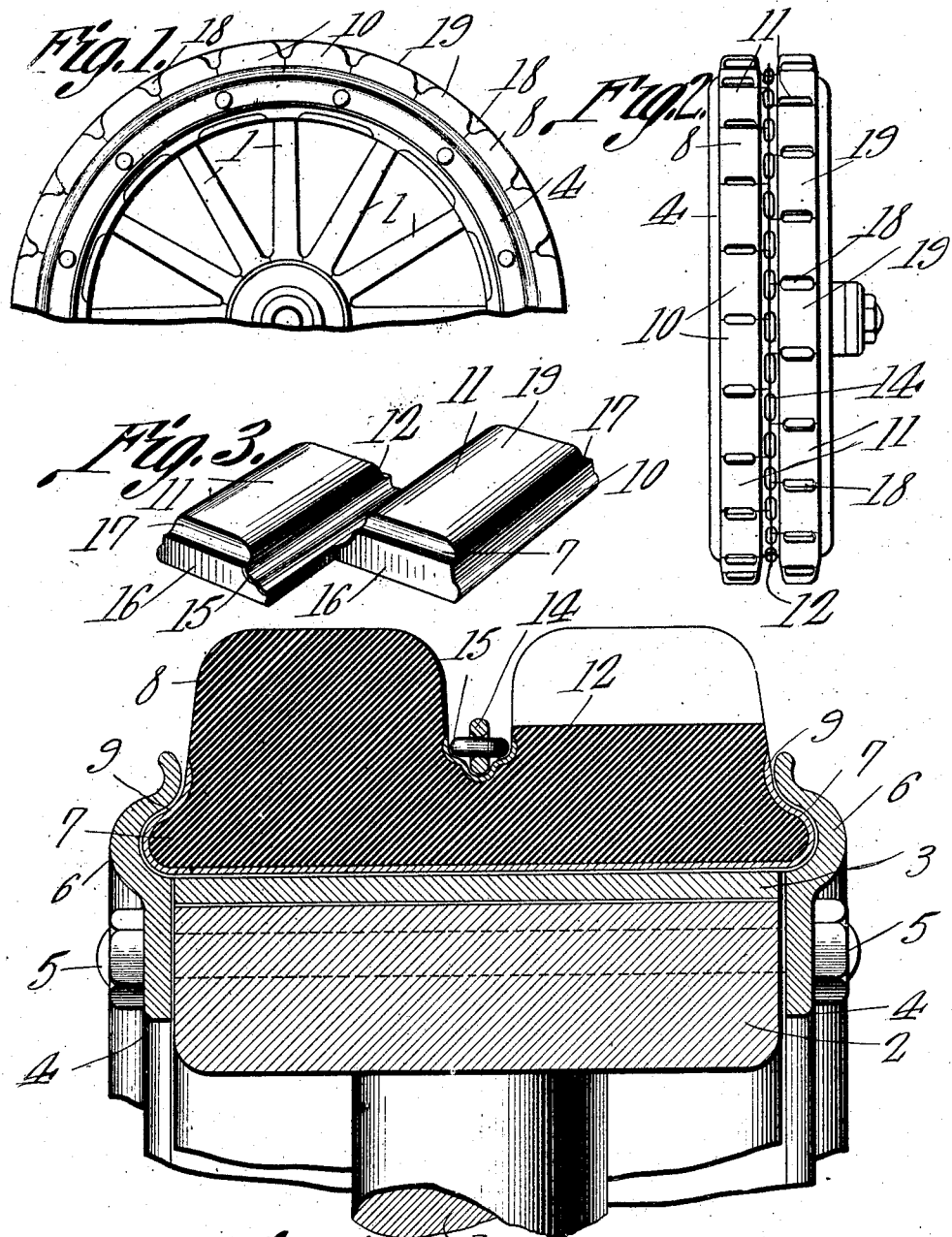

FRANKLIN W. KREMER, OF RUTHERFORD, NEW JERSEY.

HEAVY-CAR TIRE.

1,082,029.  Specification of Letters Patent.  Patented Dec. 23, 1913.

Application filed April 21, 1911. Serial No. 622,507.

*To all whom it may concern:*

Be it known that I, FRANKLIN W. KREMER, a citizen of the United States, residing at Rutherford, in the county of Bergen and State of New Jersey, have invented a new and useful Heavy-Car Tire, of which the following is a specification.

The device forming the subject matter of this application, is a tire adapted to be employed upon heavy motor trucks, sightseeing automobiles, and other vehicles demanding a tire having a high degree of resistance to compression.

The tires as applied hitherto to vehicles of this sort, have been so constructed that when the vehicle is moving forwardly, the constituent material of the tire will bunch up and crowd ahead of the point of engagement between the tire and the ground, the construction being such that the vehicle is, therefore, to all intents and purposes, constantly moving up-hill, for the reason that this mass of compressed material is continually interposed against the earth, as the wheel rotates.

It is one object of the present invention to provide a vehicle tire so constructed that there will be no bunching up of the constituent material of the tire, in advance of the point of contact between the tire and the ground.

A further object of the invention is to provide a tire for heavy vehicles, so constructed that the same may readily be mounted in place upon, and removed from the felly, without loss of time.

A further object of the invention is to provide a vehicle tire of the type herein disclosed, the constituent elements of which may readily be removed and replaced by others, without effecting a disorganization of the entire tire.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 is a fragmental side elevation; Fig. 2 is an edge elevation; Fig. 3 is a detail perspective of one of the blocks which may go to make up the tire; and Fig. 4 is a transverse section taken radially of a wheel equipped with the device herein disclosed.

In the drawings, the spokes of the wheel are denoted by the numeral 1, the same carrying the felly 2, upon which, when desired, may be superposed the rim 3. Applied to the opposite faces of the felly 2, are side plates 4 the same being held in place by bolts 5, inserted through the felly 2, or held in place in any other desired manner.

The side plates 4 are provided, beyond the rim 3, with annular seats 6, adapted to receive outstanding ribs 7, formed upon the outer edges of the tire 8, the tire 8 being preferably fashioned from rubber. Interposed between the tire 8 upon the one hand, and the rim 3 and the side plates 4 upon the other hand, is a protecting strip 9, which may be fashioned from heavy canvas.

The tire 8 may be made in any desired length. Preferably, although not necessarily, it consists of a plurality of blocks 10, the blocks 10 consisting of parallel ribs 11, defining between them a channel 12, the cross section of which consists of three lobes, adapted, as seen most clearly in Fig. 4, to receive the links of a chain 14, or other securing member, extended circumferentially of the tire. Interposed between the chain 14 and the face of the channel 12, is a wear strip 15, which may be fashioned from heavy canvas or the like.

As clearly seen in Figs. 2 and 3, the ribs 11 of the blocks 10 alternate with each other, circumferentially of the tire, the end face 16 of one rib being out of alinement with the corresponding end face 16 of the other rib, as clearly seen in Fig. 3. The end faces 16 of the ribs 11 are cut away, as shown at 17, and when a series of the blocks 10 are brought into terminal abutment and secured by the chain 14, there will be formed, in the completed tire, a series of grooves 18, extended from the edges of the tire, those grooves which are adjacent one edge of the tire being out of alinement with the grooves which are adjacent the opposite edge of the tire.

Noting Figs. 1 and 2, it will be seen that the grooves 18 serve to define, in the periphery of the tire, a plurality of protuberances 19, out of alinement with each other transversely of the tire. Each of these protuberances 19 is adapted to have individual compression, independently of the other protuberances. Owing to this construction, when the wheel rolls along the ground, each of the protuberances 19, as it comes into contact with the ground, will be permitted to expand, tangentially of the tire, without coming into contact with any of the other protuberances upon the tire. Owing to this construction, there will be no tangential compression of the tire, as an entity, at the point where the tire comes into contact with the ground, and consequently, there will be no piling up of the tire, in advance of the point where the tire engages the ground. The undesirable consequences attendant upon this piling up of the constituent material of the tire, have been referred to hereinbefore, and it will be seen that when the tire constructed as hereinbefore described, is employed upon a heavy truck, the wheel will roll smoothly along the ground, without being compelled to overcome the retarding effect of a mass of material accumulating in advance of the point of engagement between the tire and the ground. Although, in Figs. 2 and 3, the tire is shown as comprising a relatively large number of the blocks 10, it will be understood that the number of these blocks may be increased or diminished indefinitely, without in any wise jeopardizing the utility of the invention.

Having thus described the invention, what is claimed is:—

A tire fashioned from blocks adapted for engagement at their outer edges by a rim, each block comprising spaced terminally overlapped ribs having their end faces disposed out of alinement transversely of the tire and having their inner longitudinal edges coincident with the median line of the tire and connected at the overlapped portions.

In testimony that I claim the foregoing as my own, I have hereto affixed my signature in the presence of two witnesses.

FRANKLIN W. KREMER.

Witnesses:
 FRANK DE WITT,
 J. A. MILLER.

---

Copies of this patent may be obtained for five cents each, by addressing the "Commissioner of Patents, Washington, D. C."